United States Patent
Whitford et al.

(10) Patent No.: US 6,728,312 B1
(45) Date of Patent: Apr. 27, 2004

(54) ADAPTIVE VIDEO DECODING AND RENDERING WITH RESPECT TO PROCESSOR CONGESTION

(75) Inventors: Paul H. Whitford, Santa Clara, CA (US); James H. Parry, Los Gatos, CA (US); See-Mong Tan, Half Moon Bay, CA (US)

(73) Assignee: Forgent Networks, Inc., Austin, TX (US)

( * ) Notice: Subject to any disclaimer, the term of this patent is extended or adjusted under 35 U.S.C. 154(b) by 0 days.

(21) Appl. No.: 09/548,570

(22) Filed: Apr. 13, 2000

(51) Int. Cl.$^7$ ................................................. H04N 7/12
(52) U.S. Cl. ................................................. 375/240.01
(58) Field of Search ........................... 386/96, 103, 110, 386/111, 112; 375/240.01, 240.12, 240.25; H04N 7/12

(56) References Cited

U.S. PATENT DOCUMENTS

| | | | |
|---|---|---|---|
| 5,642,171 A | * 6/1997 | Baumgartner et al. | 348/515 |
| 5,949,484 A | * 9/1999 | Nakaya et al. | 348/384.1 |
| 6,130,987 A | * 10/2000 | Tanaka | 386/96 |
| 6,151,636 A | * 11/2000 | Schuster et al. | 709/247 |

* cited by examiner

Primary Examiner—Nhon Diep
(74) Attorney, Agent, or Firm—Hamilton & Terrile, LLP; Robert W. Holland (57) ABSTRACT

Disclosed is a method and system for reducing audio artifacts and/or avoiding invalid reference memory in a compressed video decoder due to processor congestion. The system and method includes decoding compressed frames of video data, and decoding compressed frames of audio data. The system and method determines whether audio data can be generated without audio artifacts. If it is determined that audio can be generated without audio artifacts, then images corresponding to the decoded frames of video data, respectively, are subsequently displayed. If however it is determined that the audio can not be generated without artifacts due to processor congestion, images are displayed and redisplayed while processor power is shifted to decoding frames of audio data.

42 Claims, 7 Drawing Sheets

ADAPTIVE VIDEO DECODING AND RENDERING WITH RESPECT TO PROCESSOR CONGESTION

BACKGROUND OF THE INVENTION

1. Field of the Invention

The present invention relates generally to audio and video decompression. More particularly, the present invention relates to a system and method for reducing audio breakups and other artifacts during audio and video decompression.

2. Description of the Related Art

Compression and subsequent decompression of audio and video data has wide spread application. Applications include digital video transmission and digital television. In a typical digital video transmission, the participants transmit and receive audio and video signals that allow the participants to see and hear one another.

To efficiently transmit the large amount of video and audio data generated at particular digital video transmission sites, digital video transmission systems typically digitize and compress the video and audio data for transmission across digital networks. Various compression schemes are available, and various digital networks are available as well.

Decompression of audio and video data at a receiving end of a digital video transmission system may be implemented in hardware, software, or a combination of hardware and software. Decompression of video data typically includes decoding sequential frames of the video data, converting the decoded frames of video data from one format (e.g. Luminance-Chrominance color space YUV)to another (e.g. Red, Green, and Blue (RGB) space), and rendering the converted frames of data. Decoding frames of video data may include decoding of blocks of pixels, performing motion compensation, inverse quantization to de-quantize data, inverse scanning to remove zig zag ordering of discrete cosine transforms, and/or inverse discrete cosine transformation to convert data from the frequency domain back to the pixel domain. Compressed frames of audio data are received and sequentially decoded into decoded frames of audio data. The decoded frames of audio data are subsequently rendered.

Figure 1:
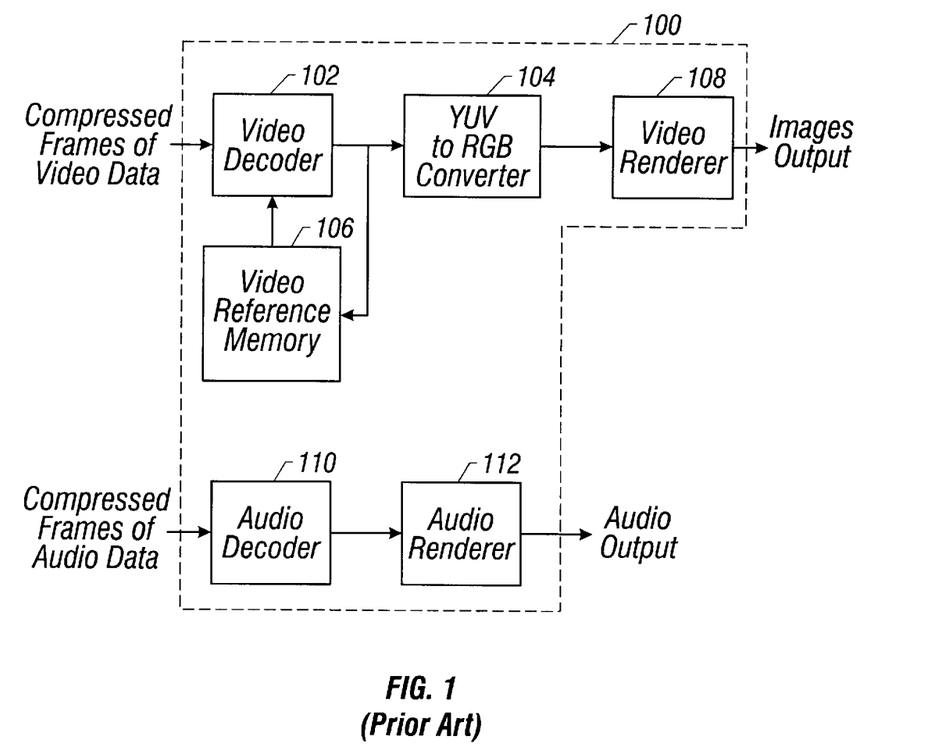
FIG. 1 is a block diagram illustrating a prior art system and method of decompressing video and audio frames of data in a digital video transmission system.

FIG. 1 shows in block diagram form, a prior art system for decompressing streams of video and audio frames in a digital video transmission system. The system in FIG. 1 includes a video decoder 102, a YUV to RGB converter 104, a video renderer 108, a Video reference memory 106, an audio decoder 110, and an audio renderer 112. The video decoder 102, YUV to RGB converter 104, video renderer 108, audio decoder 110, and audio renderer 112 are implemented wholly or partly in a processor executing respective software algorithms.

Figure 2:
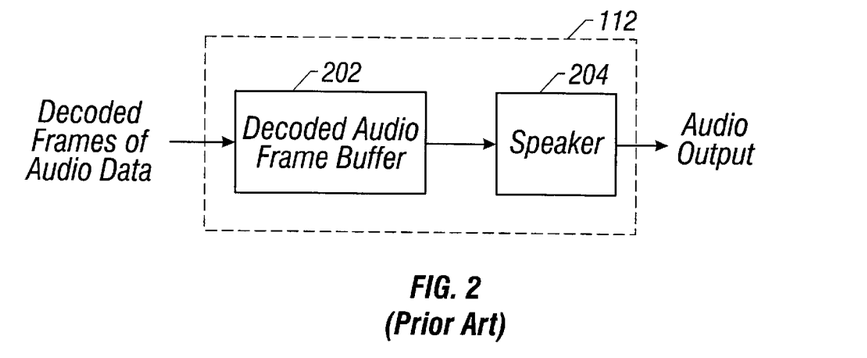
FIG. 2 is a block diagram illustrating one embodiment of a prior art circuit of rendering decoded audio frames of data shown in FIG. 1.

In FIG. 1, compressed video frames are first decoded by video decoder. Each decoded frame of video data is subsequently stored in the Video reference memory 106. A subsequent compressed frame of video data is decoded as a function of the decoded frame of video data previously stored within the reference memory. After decoding a frame of video data, YUV to RGB converter circuit 104 converts the format of the decoded frame of video data from YUV into RGB. Finally, once converted, the video renderer 108 renders the decoded frames of video data which are then subsequently displayed on a monitor. Compressed frames of audio are received and subsequently decoded by audio decoder 110. The decoded frames of audio data are subsequently rendered by audio renderer 112. More particularly FIG. 2 shows that decoded frames of audio data are first stored in a buffer 202 (typically a FIFO). Speaker 204 generates audio corresponding to the individual frames of decoded audio data stored in buffer 202. In a correctly operating digital video transmission system, speaker 204 constantly generates audio from decoded audio data stored in buffer 202.

The various activities of decoder 100 must be achieved in nearly real time. Failure to keep up with real time results in unnatural gaps, jerkiness, or slowness, in the motion video or audio presentation. Prolonged failure to keep up with the incoming compressed data will eventually result in the overflow of some buffer and the loss of a valid video frame reference which, in turn, results in chaotic video images due to the differential nature of the compressive coding.

The decompression algorithms described above may execute concurrently with an operating system. Frequently, software applications other than digital video transmission decompression algorithms, are required to be executed concurrently (i.e. multi-tasked) with the digital video transmission decompression algorithms. The processing power requirements of the operating system, digital video transmission independent software applications and the decompression algorithms described above, may cause the processor to become congested. In addition, some portions of the coded video require more processing than others. When an extended epoch of video of high computational complexity is received, the decoder may become congested. When congested, processors may not have enough processing power to execute the decompression algorithms at a rate sufficient to keep up with the source of the encoded data. Processor congestion is a state which is often incompatible with the real time requirements of digital video transmission.

Figure 3:
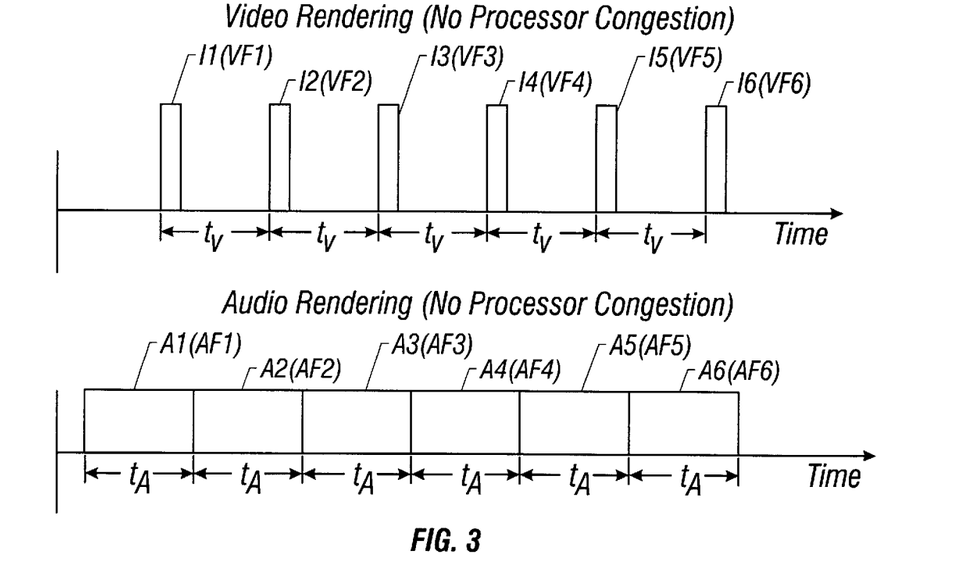
FIG. 3 illustrates the video and audio decompression when an associated processor has available processing power.
Figure 4:
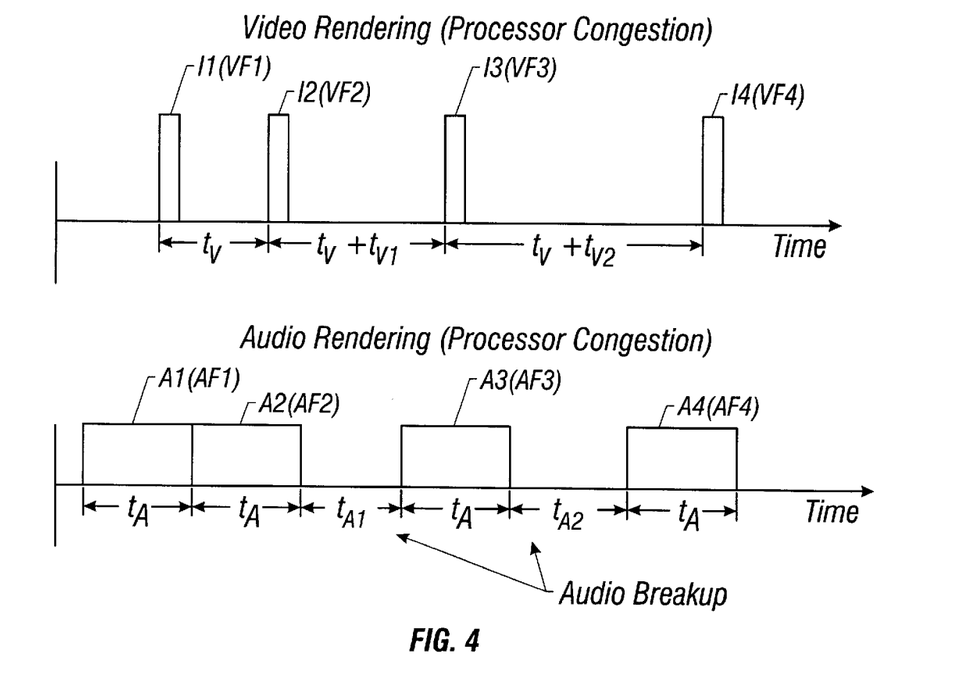
FIG. 4 illustrates the effects on video and audio decompression when a corresponding processor is congested.

Processor congestion may cause noticeable effects in the decompression of audio and video data. FIGS. 3 and 4 contrast the effects of processor congestion during video and audio decompression. FIG. 3 illustrates video and audio decompression when the processor has sufficient processing power. FIG. 4 illustrates potential effects on video and audio decompression when the processor is overloaded or congested.

FIG. 3 shows the display timing of subsequent images I1 through I6 corresponding to compressed video frames VF1 through VF6, respectively, after video frames VF1 through VF6 have been decompressed. FIG. 3 also shows the timing aspects of generating audio Al through A6 corresponding to compressed frames of audio data AF1 through AF6, respectively, after frames of audio data AF1 through AF6 have been decompressed. It is noted that various transmission formats may be used and the number of audio frames and video frames may be unequal in some transmission formats. When the processor has sufficient processing power (i.e., the processor is not congested) subsequent image frames I1 through I6 are displayed on a display screen at time intervals in general compliance with digital video transmission scheduling standards, thereby creating a continuous and artifact free sequence of displayed images. Likewise, when the processor has sufficient processing power, subsequent intervals of audio A1 through A6 are generated at time intervals in general compliance with digital video transmission scheduling standards, thereby creating continuous and artifact free audio. Audio artifacts occur when a noticeable time gap occurs between the generation of audio corresponding to any two consecutive frames of audio data.

FIG. 4, as noted above, illustrates the effects on video and audio decompression when the processor experiences congestion. With respect to video decompression, when the processor is congested, the scheduled decoding, converting, or rendering of one or more compressed frames of video data VF1 through VF6 may be-delayed, which, in-turn, may delay the display of one or more corresponding images I1 through I6 as shown in FIG. 4. Likewise, if the processor is congested, the scheduled decoding of one or more compressed frames of audio data AF1 through AF6 may be delayed, which in turn, delays the generation of one or more corresponding audio A1 through A6 as shown in FIG. 4. The delay in audio generation manifests itself in the form of audio breakup. It is noted that digital video transmission participants are highly sensitive to audio breakups when compared to video artifacts.

SUMMARY OF THE INVENTION

The present invention seeks to reduce audio breakups caused by processor congestion. A further goal of the present invention is to prevent loss of valid Video reference memory with its consequential incorrect decoding of video images. In accordance with one embodiment of the present invention, one or more selected processes in the video process are identified as not necessary for maintaining a valid state for the decoder, and one or all of such processes are temporarily bypassed. Bypassing results in skipping frames in the visual presentation and the liberation of processing power to address more important activities such as maintaining a valid decoder state and presenting an uninterrupted audio stream.

In one embodiment, a method of the present invention comprises decoding first video data. First and second audio data are also decoded into first and second decoded audio data, respectively. First audio is generated from the first decoded audio data. Typically audio is generated from a speaker of the computer system employing this embodiment of the present invention. The method then determines whether second audio can be generated from the second decoded audio data without substantial time delay between the time the first audio generation ends and the time the second audio generation begins. In one embodiment, substantial time delay may be defined as the time between first and second audio generation that creates noticeable audio breakup. If the second audio can be generated without the substantial time delay between the first and second audio, then, according to the method, the second audio is generated from the second decoded audio data and a first image corresponding to the decoded first video data is displayed. However, if second audio could not otherwise be generated without the substantial time delay, the second audio will be generated without displaying the first image corresponding to the decoded first video data. In this embodiment, the method skips displaying the first image corresponding to the decoded first video data. To reduce the visual effects of skipping the display of the first image, the method, in one embodiment, redisplays an image corresponding to previously decoded and displayed video data. Since the first image corresponding to the decoded first video data will not be displayed, the computer system need not further process the decoded first video data which in turn reduces the processing load on the processor.

While the invention is susceptible to various modifications and alternative forms, specific embodiments thereof are shown by way of example in the drawings and will herein be described in detail. For example the flow of bits carrying the audio or video data may not be packetized in some transmission formats, but the practice of the present invention would involve the method or apparatus to detect congestion and to abbreviate the video processing in response. The present invention will be described below with reference to YUV to RGB color space conversion. However, alternatives to the YUV color space may be used with equivalent advantages gained through the practice of the present invention. Additionally, the present invention will be described with reference to a general purpose processor (e.g., a processor capable of executing directly or indirectly the x86 instruction set), it being understood that the present invention has application to dedicated processors. It should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims. The use of the same reference number throughout the several Figures designates a like or similar element.

DETAILED DESCRIPTION OF ILLUSTRATED EMBODIMENTS

The term system as used herein generally describes the hardware components that in combination allow the execution of software programs or algorithms. Hardware generally includes a processor, memory media, and input/output (I/O) devices. As used herein the term processor generally describes the logic circuitry that responds to and processes basic instructions. The term "memory medium" includes an installation medium, eg, a CD ROM, or floppy disks; a volatile computer system memory such as DRAM, SRAM, rambus RAM, etc.; or a non volatile memory such as optical storage or magnetic medium, eg, a hard drive. Rambus is a registered trademark of Rambus Inc. The term "memory" is used interchangeably with "memory medium" herein. The memory medium may comprise other types of memory or combinations thereof. In addition, the memory medium may be located in a system in which the programs are executed, or may be located in a second system that connects to the first system over a network. In this later instance, the second system provides the program instructions to the first computer for execution.

The term "system" may take various forms. In general, the term can be broadly defined to encompass any device having a processor that executes instructions from a memory medium. Instructions for implementing the present invention on a system can be received by the system via a carrier medium. The carrier medium may include the memory media or storage media described above in addition to signals such as electrical, electromagnetic or digital signals, conveyed via a communication medium such as networks and/or wireless links.

As noted above, processor congestion created by an inadequate availability of processor power can cause the processor to fall behind in decompression of audio and video frames of data. In digital video transmission or digital television, this may result in audio breakup, buffer overflow or in the loss of valid reference video frames. The present invention will be described with reference to digital video transmission, it being understood that the present invention has application to any system employing video decompression where it is desirable to maintain artifact free video and/or audio rendering.

The present invention scales the amount of work performed by the processor in video decompression in response to processor congestion, thus promoting audio playback or generation with reduced breakup while preserving a video reference memory so that video images can be displayed without substantial artifacts despite the reduced video workload. The present invention seeks to maintain the highest quality of audio generation as possible with available processor processing power. The invention reduces artifacts caused by insufficient processor processing power to decompress and play back a multi-media stream in real time.

Figure 5:
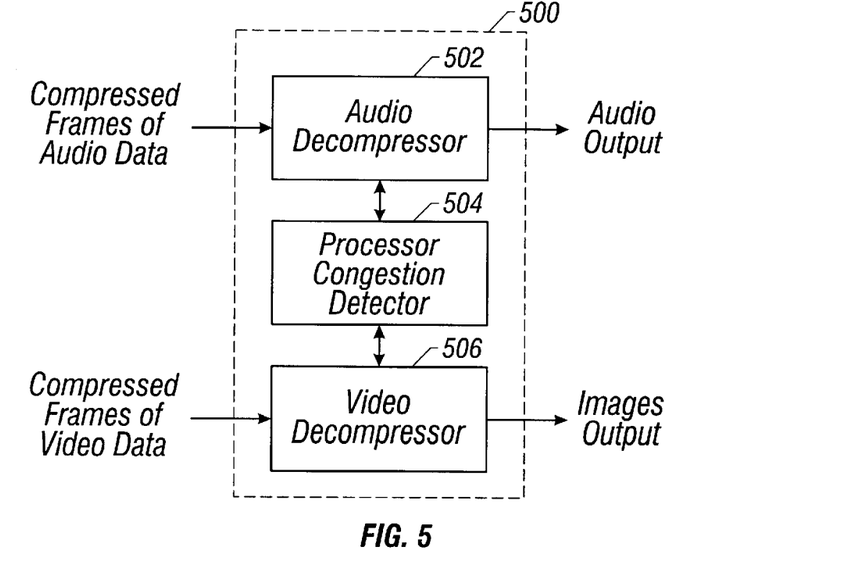
FIG. 5 is a block diagram illustrating a system and method for decompressing audio and video frames of data according to one embodiment of the present invention.

FIG. 5 is a block diagram illustrating one embodiment of the present invention. FIG. 5 shows an processor congestion detector circuit 504 coupled between an audio decompressor circuit 502 and a video decompressor circuit 506. The present invention will be described with reference to an implementation wholly or partly in software. In other words, circuits 502–506 in FIG. 5 may represent a processor executing instructions in accordance with the present invention.

Audio decompressor circuit 502 receives and decompresses a stream of compressed frames of audio data to produce an audio output. Video decompressor circuit 506 receives and decompresses a stream of compressed frames of video data to produce an image display output. The compressed frames of audio and video data are received by system 500 in real time. Processor congestion detector circuit 504 detects processor congestion which may lead to audio break up or buffer overflow. In response to detecting processor congestion, the processor congestion detector circuit 504 shifts processor power away from the video decompressor 506 in favor of the audio decompressor 502. Processor congestion detector circuit 504 may employ one of several novel techniques of detecting processor congestion as will be described more fully below.

Figure 6:
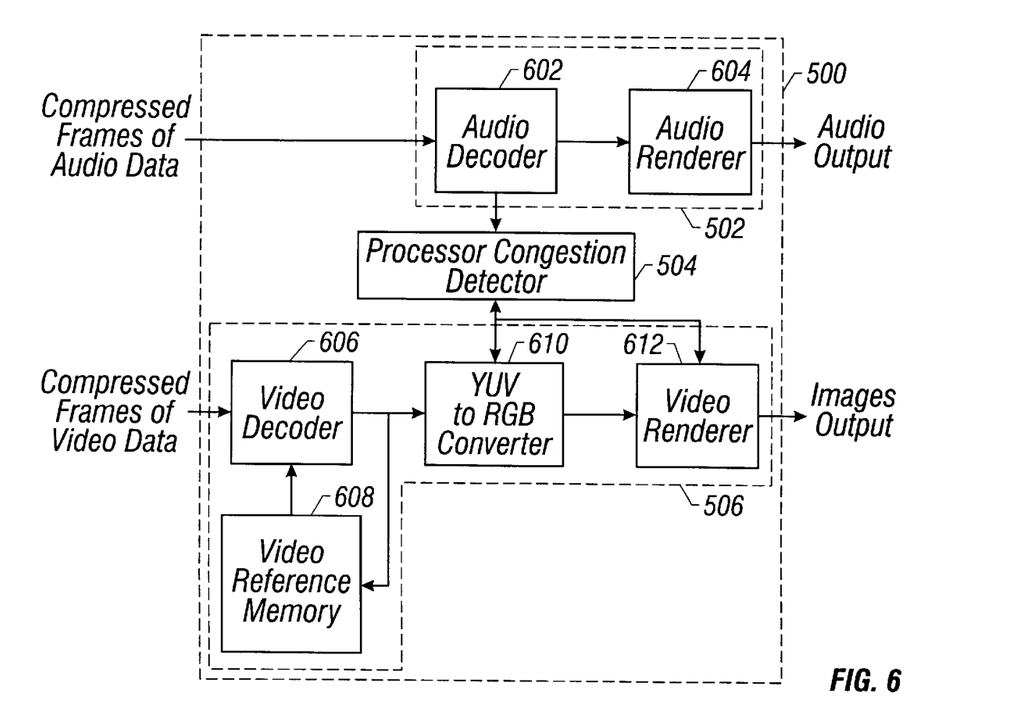
FIG. 6 is a block diagram illustrating one embodiment of the system and method shown in FIG. 5.
Figure 7:
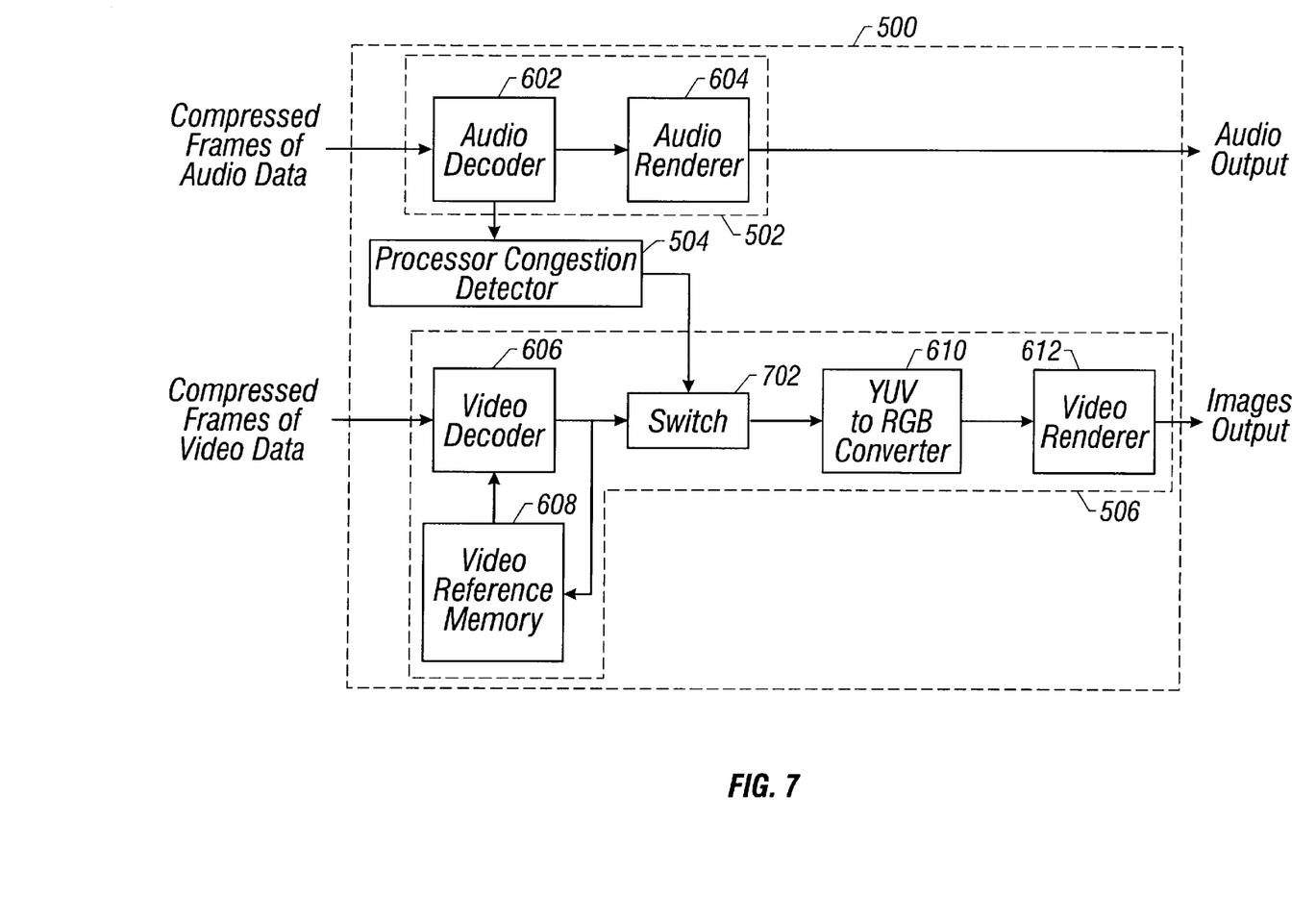
FIG. 7 is a block diagram illustrating another embodiment of the system and method shown in FIG. 5.

FIGS. 6 and 7 show alternative embodiments of the system 500 shown in FIG. 5. In FIG. 6, audio decompression circuit 502 includes an audio decoder circuit 602 coupled to an audio renderer circuit 604 and processor congestion detector circuit 504. In the illustrated embodiment of FIG. 6, the audio decoder circuit 602 is implemented by a processor executing an audio decode algorithm. Audio decoder circuit 602 decodes frames of audio data. The decoded frames of audio data are subsequently provided to audio rendering circuit 604. In the illustrated embodiment of FIG. 6, audio rendering circuit 604 is implemented in part by a processor executing an audio rendering algorithm. The audio rendering circuit 604 may also include a FIFO buffer (not shown in FIG. 6) for storing the decoded frames of audio and a speaker (not shown in FIG. 6) for generating audio from the decoded audio data stored in the FIFO.

System 500 shown in FIG. 6 also includes a video decoder circuit 606 coupled to a Video reference memory 608, a YUV to RGB converter circuit 610, processor congestion detector circuit 504, and video renderer circuit 612. In the illustrated embodiment of FIG. 6, the video decoder circuit 606 and the YUV to RGB converter circuit 610 are implemented by a processor executing separate algorithms. The video renderer circuit 612 is partly implemented by a processor executing a video-rendering algorithm. Additionally, the video renderer circuit 612 may include an image frame memory (not shown in FIG. 6) for storing a rendered image to be displayed on a monitor (not shown in FIG. 6).

Each frame of compressed video data received and decoded by circuit 606 is stored in video reference memory 608 in addition to possibly being provided to converter circuit 610 for possible conversion from YUV format to RGB format. Due to the differential nature of video compression, decoding circuit 606 decodes most frames of compressed video data as a function of a previously decoded frame of video data. As a result, reference memory 608 must be updated with the most recently decoded frame of video data. Thus, video decoder 606 decodes certain compressed video frames as a function of the contents of the Video reference memory 608.

As noted, YUV to RGB converter circuit 610 may be provided with decoded frames of video data. If the decoded frame of video is to be displayed, conversion circuit 610 performs the format conversion prior thereto. The conversion process, like the decoding process and at least a part of the rendering process, is very processor intensive. Converted frames of video data are subsequently provided to the video renderer circuit 612 for rendering. Rendered video frames are outputted for display upon a monitor as images (not shown in FIG. 6).

In the course of decompressing audio and video frames of data, the processor, implementing the circuits shown in system 500, may experience overload or congestion. More particularly, in the embodiment shown, processor congestion detector circuit 504 is coupled to audio decoding circuit 602 and receives information therefrom which is used by the processor congestion detector circuit 504 to determine whether processor congestion has caused or will lead to audio breakup or other failure. In response to detecting that audio breakup will occur, or has occurred, due to congestion, processor congestion detector circuit 504 generates a signal which instructs YUV to RGB converter circuit 610 and/or video rendering circuit 612 to temporarily disable their frame conversion and/or frame rendering processes, respectively. Given that in this embodiment the conversion and rendering process compete for the processor, the processor processing power can be redirected to audio decoding which in turn reduces the audio breakup and/or loss of valid reference memory caused by processor congestion. By temporarily disabling the video conversion and/or rendering process, the conversion and rendering of one or more decoded video frames is skipped which may lead to brief video freezing. Thus while the present invention may skip conversion and/or rendering of some decoded video frames, system 500 may continue to display previously displayed images. By continuing to redisplay previously displayed images, the present invention creates the illusion of video continuity. While video degradation may be created by skipping the conversion and rendering of certain decoded video frames when processor congestion occurs, the redisplay of prior displayed images limits this video degradation to brief moments of frozen video. When congestion ends, the video images jump ahead to regain synchronization with the incoming coded data and with the uninterrupted audio.

FIG. 7 shows an alternative embodiment of the system 500 shown in FIG. 5. The system shown in FIG. 7 is substantially similar to that shown in FIG. 6. However, rather than generating a signal which disables the converter circuit 610 and/or the rendering circuit 612, the processor congestion detector circuit 504 generates a signal which, in response to processor overload, opens a switch 702 between the video decoding circuit 606 and the converter circuit 610. Thus, switch 702 is opened in response to processor congestion. In this manner, the system shown in FIG. 7 also skips the conversion and/or rendering of one or more decoded frames of video data thereby allowing the processor to redirect it's processing power to audio decoding and video decoding. Again, in the system shown in FIG. 7, previously displayed images are redisplayed in order to reduce the video artifacts created by skipping conversion and/or rendering of one or more decoded video frames of data.

Figure 8:
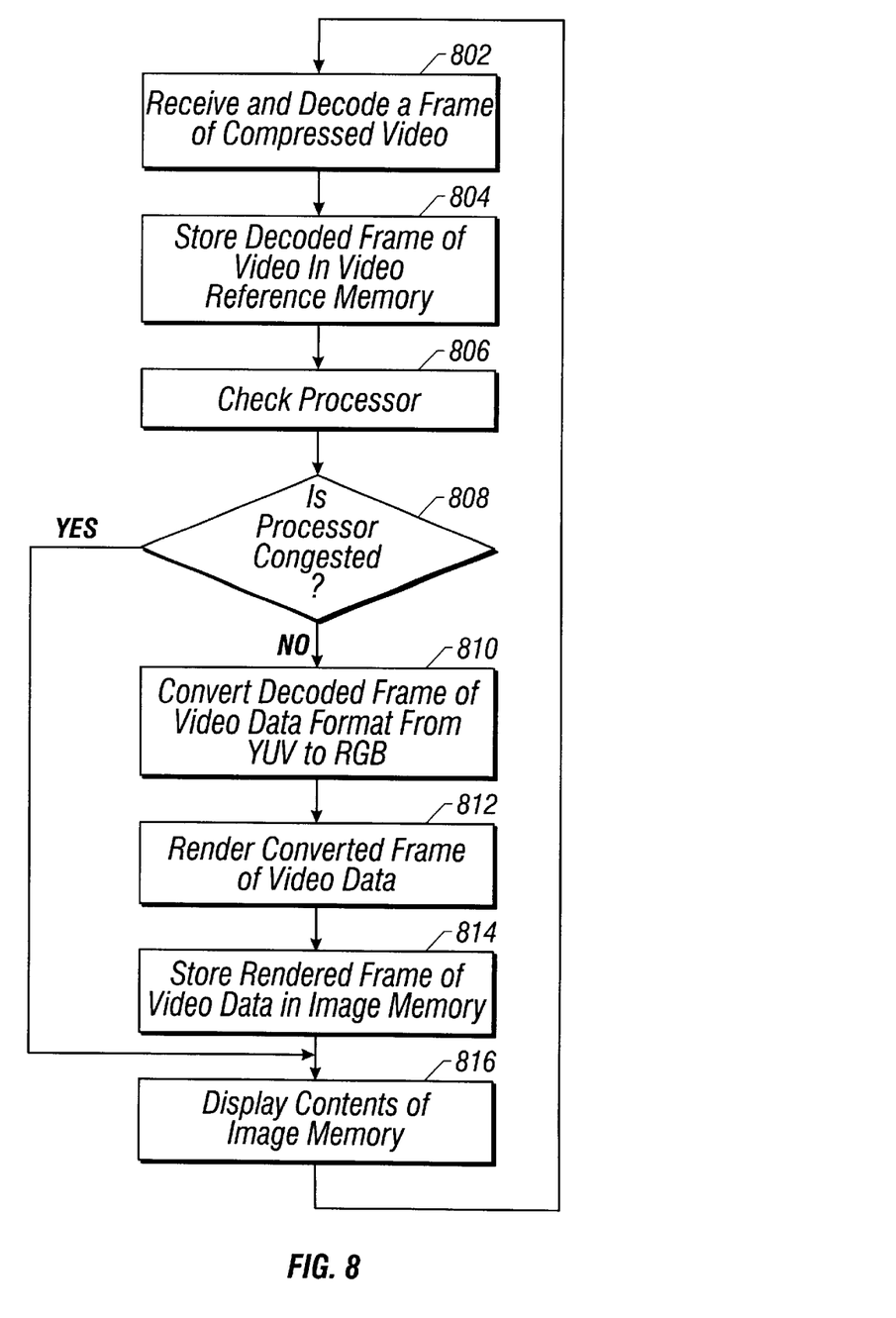
FIG. 8 is a flow chart illustrating operational aspects of the present invention.

FIG. 8 is flow chart illustrating operational aspects of the systems shown in FIGS. 5, 6 and 7. In step 802, video decode circuit 606 receives and decodes a frame of compressed video data. Thereafter, the decoded frame of video data is stored with in Video reference memory 608. In steps 806 and 808, the processor congestion detector circuit 504 checks the processor for congestion. If the processor overload detection circuit detects congestion, the processor congestion detector circuit 504 disables the converter circuit 610 and/or the rendering circuit 612 or otherwise prevents the decoded frame of video data from being converted and/or rendered. Additionally, in step 816, the previously rendered video frame, which is stored in an image memory, is redisplayed. If, however, the processor congestion detector circuit 504 does not detect processor congestion, the decoded frame of video data is converted in step 810, rendered in step 812, and stored in the image memory in step 814. The contents of image memory is displayed in step 816.

The present invention has been described with reference to the video decompression scheme in which decoded frames of video data must be converted from YUV format into RGB format prior to display thereof. However, present invention finds application in other schemes of video decompression in which this format conversion is not necessary or where alternate intermediate formats are used. It should be understood, however, that the present invention seeks to disable processor processing of decoded video frames of data in favor of decoding audio frames of data in order to ensure that audio will be generated without break up. Additionally, the systems shown in FIGS. 6 and 7 also show one technique by which a Video reference memory is maintained in order to ensure subsequent correct decoding of compressed video frames of data. Other techniques are contemplated.

Figure 9:
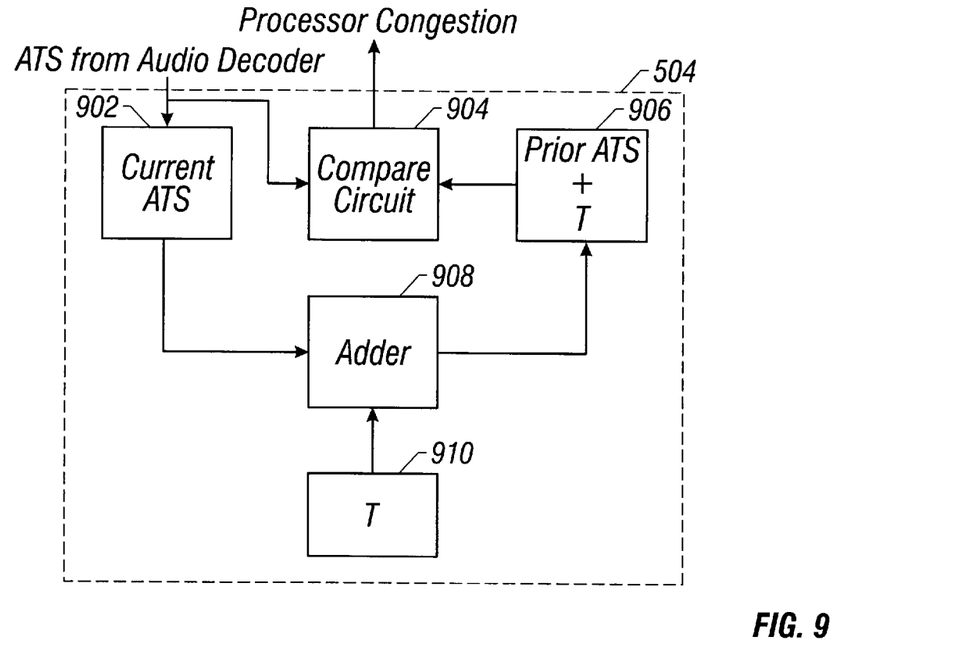
FIG. 9 is a block diagram illustrating a system and method for detecting processor congestion according to one embodiment of the present invention.
Figure 10:
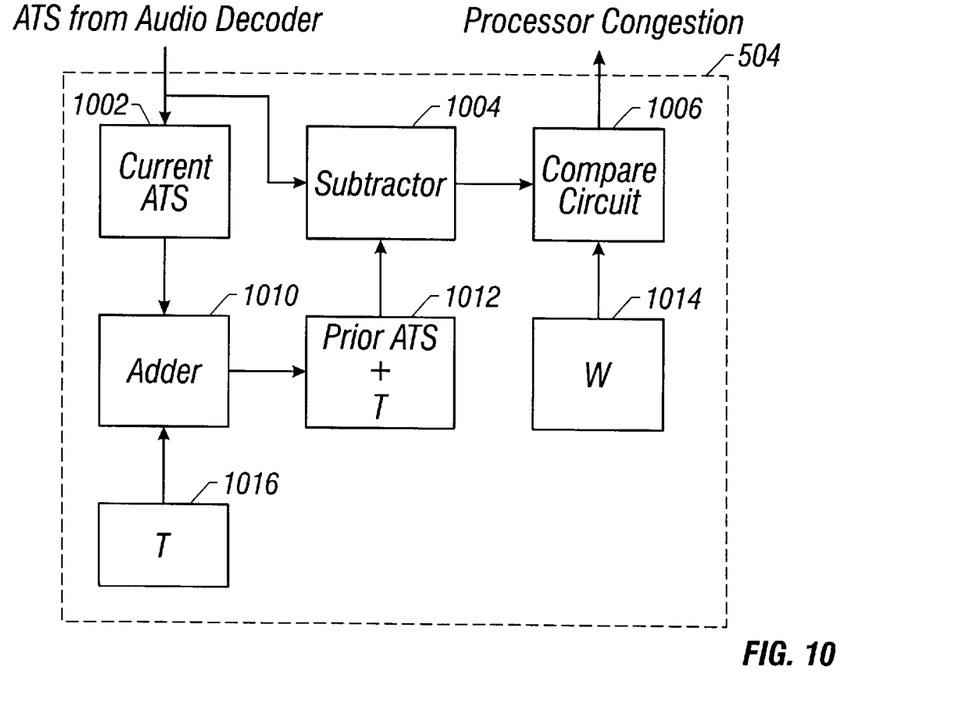
FIG. 10 is a block diagram illustrating another circuit and method of detecting processor congestion according to another embodiment of the present invention.
Figure 11:
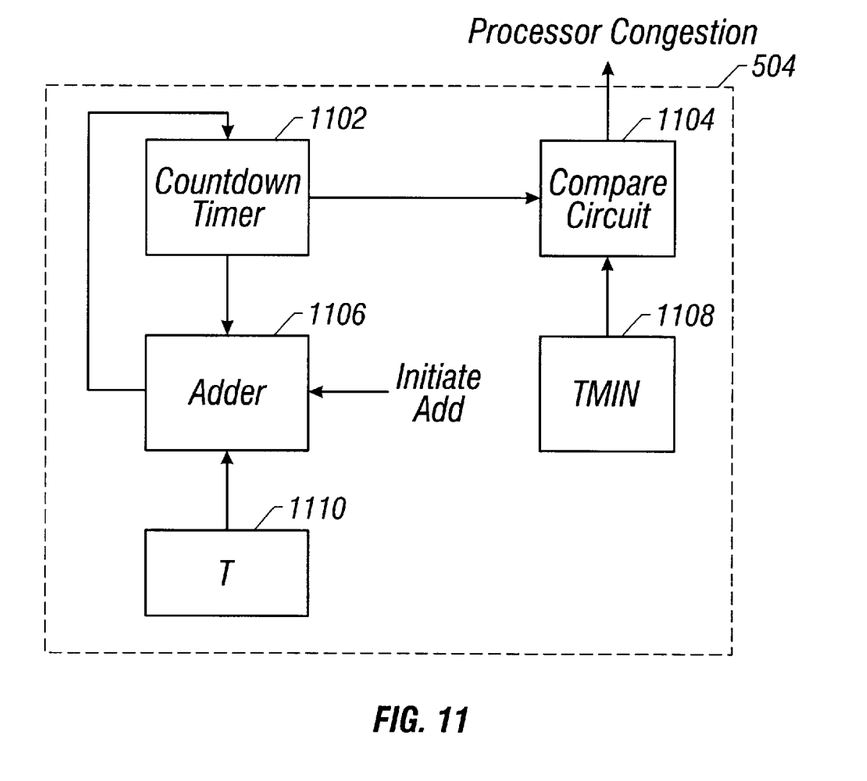
FIG. 11 is a block diagram illustrating yet another circuit and method of detecting processor congestion according to yet another embodiment of the present invention.

The processor congestion detector circuit 504 shown FIGS. 6 and 7 may detect congestion through a variety of techniques. In one technique, congestion is detected when an input buffer (not shown in the Figures) that receives compressed video and/or audio data is not emptied fast enough to match the arrival rate of new compressed audio and/or video data. With reference to FIGS. 9 through 11, several alternative methods of detecting processor congestion are described. It should be noted that each embodiment of processor congestion detector circuit 504 shown in FIGS. 9 through 11 can be implemented in hardware, software, or a combination of hardware and software.

The audio decoding circuit 602 shown in FIGS. 6 and 7 may generate an audio time stamp (ATS) each time the decoding circuit 602 finishes decoding a frame of audio data. With reference to FIG. 9, the processor congestion detector circuit 504 receives and stores the generated ATS in, for example, a current ATS memory 902. Each time memory 902 is updated with a new ATS, the prior contents of memory 902 are added to T by adder 908. T is the time it takes to normally render and/or generate audio for any given decoded frame of audio data. The result of adding T to the contents of memory 902 is stored in, for example, memory 904. Thus, memory 906 contains the contents of the previous ATS added to T while memory 904 contains the contents of the current ATS.

For sake of clarity, the current ATS can be viewed as the time at which audio associated with one decoded audio frame is ready to be generated. The prior ATS added to T can be seen, in combination, as the time at which audio associated with another decoded audio, will finish, wherein the another frame of audio data is scheduled prior to the one decoded frame of audio.

Compare circuit 904 compares the contents of memories 902 and 906. If the prior ATS added to T is later in time when compared to the current ATS, processor has the ability to process compressed audio files and generate audio without audio breakup. However, if the current ATS as stored in memory 902 is later in time when compared with the contents of memory 906, the processor is deemed congested and a signal is generated by compare circuit 904 to disable the video conversion and/or rendering circuits or otherwise skip the conversion and decoding of one or more decoded frames of video data in order to free up processing power for the audio decoding and/or audio rendering.

FIG. 10 shows an alternative embodiment of the processor congestion detector circuit 504. The embodiment shown in FIG. 10 is similar to that shown in FIG. 9. However, the embodiment shown in FIG. 10 is distinguishable in several aspects. The embodiment shown in FIG. 10 includes a circuit 1004 for subtracting a current ATS stored in memory 1002 from the contents of memory 1012. Memory 1002 stores the ATS generated by the audio decode circuit 602 each time the audio decode circuit finishes decoding a frame of audio data. Memory 1012 stores the prior ATS added to T, the time normally needed to render and/or generate audio for a given frame of decoded audio data. The difference between the contents of memories 1002 and 1012 is inputted to a compare circuit 1006 which compares the difference with W, a predetermined value. If the difference is less than W, the detection circuit generates a signal which disables conversion and/or rendering of decoded video frames or opens switch 702 shown in FIG. 7 thereby preventing a decoded frame of video data from being converted and rendered. If, on the other hand, the difference is greater than or equal to W, then the processor is not deemed congested. W can be selected to be a time which ensures that audio breakup can be predicted and corrected before audio break up occurs.

FIG. 11 shows yet another embodiment of the processor congestion detector circuit 504 shown in FIGS. 5, 6 and 7. FIG. 11 shows an adder circuit 1106 coupled to a countdown timer 1102. The value of the countdown timer 1102 is provided to the adder which in turn adds the contents of the countdown timer to T. The value of the countdown timer 1102 is compared with TMIN in comparison circuit 1104. Essentially, the contents of the count down timer are added to T each time the audio decode circuit finishes decoding a frame of audio data. The results of the addition are immediately stored back into the countdown timer. The content of countdown timer is constantly monitored by the compare circuit 1104. If the contents of countdown time falls below TMIN, a signal is generated indicating processor congestion. TMIN can be selected such that audio breakup can be predicted before the audio breakup occurs. The countdown timer counts down at a rate which is related to the rate which audio is generated from the decoded frames of audio data.

Although the system and method of the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
    a processor decoding a first frame of video data, wherein the decoded first frame of video data is formatted in YUV;
    the processor decoding first and second audio data into first and second decoded audio data, respectively;
    generating first audio from the first decoded audio data;
    determining whether second audio can be generated from the second decoded audio data without a substantial time delay between the time the first audio generation ends and the time the second audio generation begins;
    in response to determining that the second audio can be generated without the substantial delay, generating second audio from the second decoded audio data and the processor converting the decoded first frame of video data formatted in YUV into a decoded frame of video data formatted in RBG;
    in response to determining that the second audio cannot be generated without the substantial delay, generating second audio from the second decoded audio data without the processor converting the decoded first frame of video data formatted in YUV into a decoded frame of video data formatted in RBG.

2. The method of claim 1 further comprising:
    storing the decoded first frame of video in a reference memory;
    the processor decoding a second frame of video data, wherein the decoded second frame of video data is formatted in YUV, and wherein the second frame of video data is decoded as a function of the decoded first frame of video stored in the reference memory;
    replacing the decoded first frame of video in the reference memory with the decoded second frame of video data.

3. The method of claim 1 further comprising:
    displaying an image corresponding to a frame of video data decoded prior to the decoding of the first frame of data;
    in response to determining that the second audio cannot be generated without the substantial delay, redisplaying the image.

4. The method of claim 1 wherein determining comprises determining whether the processor has processing power to finish converting the decoded first frame of video data and decoding the second audio data prior to completely generating the first audio.

5. A method comprising:
    a processor decoding a first frame of video data, wherein the decoded frame of video data is formatted in YUV;
    the processor decoding first and second audio data into first and second decoded audio data, respectively;
    sequentially generating first and second audio from the first and second decoded audio data, respectively;
    determining whether the second audio can be generated after generating the first audio without substantial time delay between the time the first audio generation ends and the time the second audio generation begins;
    in response to determining that the second audio data can be sequentially generated after generating the first audio data without substantial time delay therebetween, the processor converting the decoded frame of video data formatted in YUV into a decoded frame of video data formatted in RBG;
    in response to determining that the second audio data cannot be sequentially generated after generating the first audio data without substantial delay therebetween, the processor refraining from converting the decoded first frame of video data formatted in YUV into a decoded frame of video data formatted in RBG.

6. The method of claim 5 wherein determining comprises determining whether the processor has processing power to finish converting the decoded frame of video data and decoding the second audio data prior to completely generating the first audio.

7. The method of claim 5 further comprising updating a reference frame memory with the decoded frame of video data regardless of whether it is determined that the second audio data can be sequentially generated after generating the first audio data without substantial time delay therebetween.

8. The method of claim 5 further comprising:
    displaying an earlier image corresponding to an image frame decoded prior to decoding the first image frame;
    in response to determining that the second audio data cannot be sequentially generated after generating the first audio data without substantial time delay therebetween, redisplaying the earlier image frame.

9. A method comprising:
    decoding a plurality of frames of video data into respective frames of decoded video data, wherein each of the decoded frames of video is formatted in YUV;
    decoding frames of audio data into respective frames of audio data;
    generating audio from the frames of decoded audio data;
    converting all of the plurality of decoded frames of video data formatted in YUV into respective decoded frames of video data in RBG format if the audio can be generated without audio breakup, and;
    converting only a portion of the plurality of decoded frames of video data formatted in YUV into respective decoded frames of video data in RBG format if the audio cannot otherwise be generated without audio breakup.

10. The method of claim 9 further comprising updating a memory buffer with each of the decoded frames of video data, wherein each of the plurality of frames of video data is decoded as a function of the contents at the memory buffer.

11. The method of claim 9 further comprising:
displaying images corresponding to all of the decoded frames of video data if the audio can be generated without audio breakup;
displaying images corresponding to less than all of the decoded frames of video data if the audio cannot otherwise be generated without audio breakup.

12. A method comprising:
a processor decoding a plurality of frames of video data into respective frames of decoded video data, wherein each of the decoded frames of video is formatted in YUV;
the processor decoding frames of audio data into respective frames of decoded frames of audio data;
generating audio from the frames of decoded audio data;
determining whether the processor has more than enough processing power to ensure that the audio will be generated without breakup;
selecting and converting a portion of the plurality of decoded frames of video data formatted in YUV into respective decoded frames of video data in RBG format where the portion is selected so that the processor has enough processing power to ensure that the audio will be generated without breakup.

13. A method comprising:
a processor decoding first, second, and third frames of video data to generate first, second, and third frames of decoded video, respectively, wherein each of the first, second, and third decoded frames of video data is formatted in YUV;
the processor converting the first frame of decoded video data in YUV format into a first frame of decoded video data in RBG format;
the processor decoding first and second frames of audio data to generate first and second frames of decoded audio data, respectively;
sequentially generating first and second audio from the first and second decoded frames of audio data, respectively;
determining whether second audio data will be sequentially generated after generating the first audio without a substantial time delay between the time at which the first audio ends and the time at which the second audio begins, wherein the determining occurs in response to the processor converting the first frame of decoded video data;
if it is determined that the second audio will be sequentially generated after the first audio without the substantial time delay, the processor converting the second and third frames of decoded video data in YUV format into second and third frames of decoded video data, respectively, in RBG format;
if it is determined that the second audio will not be sequentially generated after the first audio without the substantially time delay, the processor converting only the third frame of decoded video data in YUV format into a third frame of decoded video data in RBG format.

14. A method comprising:
a processor decoding a frame of video data, wherein the decoded frame of video data is formatted in YUV;
the processor decoding first and second audio data into first and second decoded audio data, respectively;
calculating a rate at which the processor is decoding frames of audio data, wherein the calculated rate is defined as the number of frames of audio data decoded during a period of time;
comparing the calculated rate with a predetermined rate at which frames of audio data are played;
if the calculated rate is greater than or equal to the predetermined rate by a given RMIN, the processor converting the decoded frame of video formatted in YUV into a decoded frame of video data formatted in RBG;
if the calculated rate is not greater than or equal to the predetermined rate by a given value RMIN, disabling the processor from converting the decoded frame of video data formatted in YUV into the decoded frame of video data formatted in RBG.

15. A carrier medium comprising instructions executable by a computer system to implement a method, the method comprising:
a processor of the computer system decoding a first frame of video data, wherein the decoded first frame of video data is formatted in YUV;
the processor decoding first audio data and second audio data into first and second audio data decoded audio data, respectively;
a speaker of the computer system generating first audio from the first decoded audio data;
determining whether second audio can be generated from the second decoded audio data with a substantial time delay between the time the first audio generation ends and the time the second audio generation begins;
in response to determining that second audio can be generated without the substantial time delay, generating second audio from the second decoded audio data, and the processor converting the decoded first frame of video data formatted in YUV into a decoded fame of video data formatted in RBG;
in response to determining that second audio cannot be generated without the substantial time delay, generating second audio from the second decoded audio data without the processor converting the decoded first frame of video data formatted in YUV into a decoded frame of vidoe data formatted in RBG.

16. The carrier medium of claim 15 wherein the method further comprises:
storing the decoded first frame of video in a reference memory of the computer system;
the processor decoding a second frame of video data, wherein the decoded second frame of video data is formatted in YUV, and wherein the second frame of video data is decoded as a function of the decoded first frame of video stored in the reference memory;
updating the reference memory with the decoded second frame of video data.

17. The carrier medium of claim 15 wherein the method further comprises;
displaying an image corresponding to a frame of data decoded prior to the decoding of the first frame of data;
in response to determining that second audio cannot be generated without the substantial time delay, redisplaying the image.

18. The carrier medium of claim 15 wherein determining comprises determining whether the processor has processing power to finish converting the decoded first frame of video data and decoding the second audio data prior to completely generating the first audio.

19. A carrier medium comprising instructions executable by a computer system to implement a method, the method comprising:

a processor of the computer system decoding a first frame of video data, wherein the decoded frame of video data is formatted in YUV;

the processor decoding first and second audio data into first and second decoded audio data, respectively;

a speaker of the computer system sequentially generating first and second audio from the first and second decoded audio data, respectively;

determining whether second audio can be generated after generating the first audio without substantial time delay between the time the first audio generation ends and the time the second audio generation begins;

in response to determining that the second audio data can be sequentially generated after generating the first audio data without substantial time delay therebetween, the processor converting the decoded frame of video data formatted in YUV into a decoded fame of video data formatted in RBG;

in response to determining that the second audio data cannot be sequentially generated after generating the first audio data without substantial time delay therebetween, disabling the processor from converting the decoded frame of video data formatted in YUV into the decoded frame of video data formatted in RBG.

20. The carrier medium of claim 19 wherein determining comprises determining whether the processor has processing power to finish converting the decoded frame of video data and decoding the second audio data prior to completely generating the first audio.

21. The carrier medium of claim 19 wherein the method further comprises updating a reference frame memory with the decoded frame of video data regardless of whether it is determined that the second audio data can be sequentially generated after generating the first audio data without substantial time delay therebetween.

22. The carrier medium of claim 19 wherein the method further comprises:

displaying an image corresponding to an image frame decoded prior to decoding the first image frame;

in response to determining that the second audio data cannot be sequentially generated after generating the first audio data without substantial time delay therebetween, redisplaying the image frame.

23. A carrier medium comprising instructions executable by a computer system to implement a method, the method comprising:

decoding a plurality of frames of video data into respective frames of decoded video data, wherein each of the decoded frames of video is formatted in YUV;

decoding frames of audio data into respective frames of decoded frames of audio data;

generating audio from the frames of decoded audio data;

converting all of the plurality of decoded frames of video data formatted in YUV into respective decoded frames of video data in RBG format if the audio can be generated without audio breakup, and;

converting only a portion of the plurality of decoded frames of video data formatted in YUV into respective decoded frames of video data in RBG format if the audio cannot be generated without audio breakup.

24. The carrier medium of claim 23 wherein the method further comprises updating a memory location with each of the decoded frames of video data, wherein each of the plurality of frames of video data is decoded as a function of the contents at the memory location.

25. The carrier medium of claim 23 wherein the method further comprises:

displaying images corresponding to all of the decoded frames of video data if the audio can be generated without audio breakup;

displaying images corresponding to less than all of the decoded frames of video data if the audio cannot be generated without audio breakup.

26. A carrier medium comprising instructions executable by a computer system to implement a method, the method comprising:

a processor of the computer system decoding a plurality of frames of video data into respective frames of decoded video data, wherein each of the decoded frames of video is formatted in YUV;

the processor decoding frames of audio data into respective frames of decoded frames of audio data;

generating audio from the frames of decoded audio data;

determining whether the processor has more than enough processing power to ensure that the audio will be generated without breakup;

converting all of the plurality of decoded frames of video data formatted in YUV into respective decoded frames of video data in RBG format if the processor is determined to have more than enough processing power to ensure that the audio will be generated without breakup, and;

converting only a portion of the plurality of decoded frames of video data formatted in YUV into respective decoded frames of video data in RBG format if the processor is determined to have more than enough processing power to ensure that the audio will be generated without breakup.

27. A carrier medium comprising instructions executable by a computer system to implement a method, the method comprising:

a processor of the computer system decoding first, second, and third frames of video data to generate first, second and third frames of decoded video, respectively, wherein each of the first, second and third decoded frames of video data is formatted in YUV;

the processor converting the first frame of decoded video data in YUV format into a first frame of decoded video data in RBG format;

the processor decoding first and second frames of audio data to generate first and second frames of decoded audio data frames, respectively;

sequentially generating first and second audio from the first and second decoded frames of audio data, respectively;

determining whether second audio will be sequentially generated after generating the first audio without a substantial time delay between the time at which the first audio ends and the time at which the second audio begins, wherein the determining occurs in response to the processor converting the first frame of decoded video data;

if it is determined that the second audio will not be sequentially generated after the first audio without the substantial time delay, the processor converting the second and third frames of decoded video data in YUV format into second and third frames of decoded video data, respectively, in RBG format;

if it is determined that the second audio will not be sequentially generated after the first audio without the substantial time delay, the processor converting only the third frame of decoded video data in YUV format into a third frame of decoded video data in RBG format.

28. A carrier medium comprising instructions executable by a computer system to implement a method, the method comprising:
   a processor of the computer system decoding a first frame of video data, wherein the decoded frame of video data is formatted in YUV;
   the processor decoding first and second audio data into first and second decoded audio data, respectively;
   calculating a rate at which the processor is decoding frames of audio data;
   comparing the calculated rate with a predetermined rate at which the processor decodes frames of audio data;
   if the calculated rate is greater than or equal to the predetermined rate by a given value RMIN, the processor converting the decoded frame of video data formatted in YUV into a decoded frame of video data formatted in RBG;
   if the calculated rate is not greater than or equal to the predetermined rate by a given value RMIN, disabling the processor from converting the decoded frame of video data formatted in YUV into the decoded frame of video data formatted in RBG.

29. A method comprising:
   decoding a first frame of video data;
   decoding first and second audio data into first and second decoded audio data, respectively;
   generating first audio from the first decoded audio data;
   determining whether second audio can be generated from the second decoded audio data without substantial time delay between the time the first audio generation ends and the time the second audio generation begins;
   in response to determining that second audio can be generated without the substantial time delay, generating second audio from the second decoded audio data and displaying a first image corresponding to the decoded first frame of video data;
   in response to determining that second audio cannot be generated without the substantial time delay, generating second audio from the second decoded audio data without displaying the first image corresponding to the decoded first frame of video data.

30. A carrier medium comprising instructions executable by a computer system to implement a method, the method comprising:
   decoding a first frame of video data;
   decoding first and second audio data into first and second decoded audio data, respectively;
   generating first audio from the first decoded audio data;
   determining whether second audio can be generated from the second decoded audio data without substantial time delay between the time the first audio generation ends and the time the second audio generation begins;
   in response to determining that second audio can be generated without the substantial time delay, generating second audio from the second decoded audio data and displaying a first image corresponding to the decoded first frame of video data;
   in response to determining that second audio cannot be generated without the substantial time delay, generating second audio from the second decoded audio data without displaying the first image corresponding to the decoded first frame of video data.

31. A method comprising:
   decoding first and second frames of video data;
   decoding first and second frames of audio data into first and second frames of decoded audio data, respectively;
   generating first audio from the first decoded frame of audio data;
   determining whether second audio can be generated from the second decoded frame of audio data without substantial time delay between the time the first audio generation ends and the time the second audio generation begins;
   in response to determining that second audio can be generated without the substantial time delay, subsequently displaying first and second images corresponding to the first and second decoded frames of video data, respectively, wherein the second image is displayed after displaying the first image;
   in response to determining that second audio cannot be generated without the substantial time delay, displaying the first image and subsequently redisplaying the first image.

32. A carrier medium comprising instructions executable by a computer system to implement a method, the method comprising:
   decoding first and second frames of video data;
   decoding first and second frames of audio data into first and second frames of decoded audio data, respectively;
   generating first audio from the first decoded frame of audio data;
   determining whether second audio can be generated from the second decoded frame of audio data without substantial time delay between the time the first audio generation ends and the time the second audio generation begins;
   in response to determining that second audio can be generated without the substantial time delay, subsequently displaying first and second images corresponding to the first and second decoded frames of video data, respectively, wherein the second image is displayed after displaying the first image;
   in response to determining that second audio cannot be generated without the substantial time delay, displaying the first image and subsequently redisplaying the first image.

33. A method for decoding video data with a processor, the processor running plural applications including an application to maintain a decoder state, the decoder state for a frame of video data supporting decoding of a subsequent frame of video data, the method comprising:
   decoding a first frame of compressed video data to form a first frame of decoded video data, wherein said first frame of decoded video includes a decoder state for decoding a second frame of compressed video data;
   storing the decoder state for decoding the second frame of compressed video data;
   detecting congestion;
   in response to detecting congestion, refraining from performing a processing task associated with the plural applications in order to prioritize processor use to maintain the decoder state for decoding the second frame of compressed video data to form the second frame of decoded video data, wherein said second frame of decoded video includes a decoder state for decoding a third frame of compressed video data.

34. The method of claim 33 wherein the processing task comprises a color space conversion of decoded video data.

35. The method of claim 33 wherein the processing task comprises rendering of video data.

36. The method of claim 33 wherein the processing task comprises training an acoustic echo handler.

37. The method of claim 33 wherein the processing task comprises reallocation of a processor to tasks scheduled by an operating system.

38. The method of claim 33 further comprising continuing to display image data derived from a frame of compressed video data.

39. An apparatus comprising:
- a processor operable to perform plural processing tasks, the processing tasks including decoding compressed video data and audio data and non-decoding processing tasks, and;
- a processor congestion detector, wherein the processor congestion detector is configured to detect if the processor is congested;
- wherein the processor, in response to the processor congestion detector detecting processor congestion, bypasses at least one non-decoding processing task to instead decode compressed video data to determine information necessary for decoding subsequent compressed video data.

40. An apparatus comprising:
- a processor for decoding compressed video data at a first rate and audio data at a second rate;
- a processor congestion detector, wherein the processor congestion detector is configured to detect if the processor is decoding compressed audio data below the second rate;
- wherein the processor refrains from performing a processing task other than decoding compressed video data to determine information necessary for decoding subsequent compressed video data.

41. A method comprising:

a processor decoding compressed video data at a first rate;

the processor decoding compressed audio data at a second rate;

the processor decoding compressed audio data at a rate below the second rate;

detecting the processor is decoding compressed audio data at the rate below the second rate;

wherein the processor refrains from performing a processing task other than decoding compressed video data to determine information necessary for decoding subsequent compressed video data.

42. A carrier medium comprising instructions executable by a computer system to implement a method, the method comprising:

a processor decoding compressed video data at a first rate;

the processor decoding compressed audio data at a second rate;

the processor decoding compressed audio data at a rate below the second rate;

detecting the processor is decoding compressed audio data at the rate below the second rate;

wherein the processor refrains from performing a processing task other than decoding compressed video data to determine information necessary for decoding subsequent compressed video data.

* * * * *